United States Patent [19]

Gupta et al.

[11] Patent Number: 4,729,058
[45] Date of Patent: Mar. 1, 1988

[54] SELF-LIMITING CAPACITOR FORMED USING A PLURALITY OF THIN FILM SEMICONDUCTOR CERAMIC LAYERS

[75] Inventors: Tapan K. Gupta, Monroeville; William D. Straub, Pittsburgh, both of Pa.

[73] Assignee: Aluminum Company of America, Pittsburgh, Pa.

[21] Appl. No.: 940,348

[22] Filed: Dec. 11, 1986

[51] Int. Cl.$^4$ .................. H01G 4/10; H01G 7/00
[52] U.S. Cl. .................. 361/321; 29/25.42; 252/62.3 B
[58] Field of Search ........... 361/320, 321, 328, 329, 361/308–310; 252/518, 62.3 R, 62.32 B; 501/138; 29/25.42

[56] References Cited

U.S. PATENT DOCUMENTS

| | | | |
|---|---|---|---|
| 3,458,455 | 7/1969 | Jonker | 252/62.3 R X |
| 3,694,710 | 9/1972 | Kirschner | 361/321 |
| 4,081,857 | 3/1978 | Hanold | 29/25.42 X |
| 4,452,728 | 6/1984 | Carlson et al. | 252/518 |
| 4,452,729 | 6/1984 | Carlson et al. | 252/518 |
| 4,460,497 | 7/1984 | Gupta et al. | 252/518 |
| 4,513,350 | 4/1985 | Coleman | 361/321 |
| 4,641,221 | 2/1987 | Khoury et al. | 361/321 |

FOREIGN PATENT DOCUMENTS

| | | | |
|---|---|---|---|
| 83003 | 5/1982 | Japan | 252/62.32 B |
| 128707 | 7/1984 | Japan | 501/138 |

OTHER PUBLICATIONS

"Technical Information Ceramic Capacitors", Centre Engineering, State College, Pa.

Primary Examiner—Donald A. Griffin
Attorney, Agent, or Firm—Andrew Alexander; John P. Taylor

[57] ABSTRACT

The invention discloses a self-limiting ceramic capacitor characterized by high capacitance and transient voltage protective properties comprising a plurality of thin layers of a zinc oxide-based ceramic material having non-linear resistance characteristics with each layer having a conductive coating on at least one surface thereof and the coated ceramic layers sintered together to form a laminated stack. A conductive coating comprising a first electrode of the capacitor is formed on a first edge of the laminated stack of layers and is in electrical communication with a portion of the conductive coating on some of the layers extending to that edge of the layer. Conductive material comprising a second electrode of the capacitor is formed on a second and opposite edge of the laminated stack of layers in electrical communication with a portion of the conductive coating on at least some of the other layers in the plurality of layers having a portion of the conductive coating thereon extending to the second and opposite edge of the layers.

28 Claims, 12 Drawing Figures

VOLTAGE
PARALLEL CONNECTION

SELF-LIMITING CAPACITOR FORMED USING A PLURALITY OF THIN FILM SEMICONDUCTOR CERAMIC LAYERS

BACKGROUND OF THE INVENTION

1. Field of the Invention

This invention relates to ceramic capacitors. More particularly, this invention relates to a ceramic capacitor possessing in situ high voltage surge protection (varistor characteristic) made using thin films of ZnO-based ceramic dielectric material.

2. Description of the Related Art

Capacitors may be damaged when subjected to an excessive voltage stress, i.e., a voltage surge above the rated voltage of the device. The effects on the capacitor of such excessive voltage surges can be eliminated by using an external non-linear resistive device across the capacitor to shunt the high voltage.

Such a non-linear resistive device, known as a varistor, exhibits high resistance to low voltages. However, when the voltage exceeds a predetermined threshold, the resistance of the varistor rapidly changes permitting a high voltage to easily pass through the device.

Such devices are described in Carlson et al U.S. Pat. Nos. 4,452,728 and 4,452,729 as well as in Gupta et al U.S. Pat. No. 4,460,497. These patents describe the construction of non-linear resistive devices or varistors using a metal oxide mixture of at least about 90 mole % ZnO with the balance comprising other metal oxides including aluminum oxide and a minor amount of either boron oxide or an alkali metal oxide or both.

While such external devices are capable of protecting a capacitor from excessive voltage surges, both economics and the ever increasing demand for miniaturization of electronic components make it desirable to produce a capacitor possessing in situ high voltage surge protection properties, i.e., a self-limiting capacitor.

A zinc oxide-based varistor, like any metal oxide ceramic material having metal electrodes attached thereto, exhibits some capacitance due to the dielectric properties of the zinc oxide, particularly across the grain boundaries. However, the capacitance of such a varistor, which is conventionally formed as a disc device with a thickness of as much as 0.4 to 4 cm to provide the desired low voltage resistance, is normally about tens of picofarads per cm$^2$, which is too low to be of value in normal applications for a self-limiting capacitor.

It is known that monolithic multilayer ceramic capacitors can be made by using layers of ceramic films coated with electrodes. These are then stacked together to form a capacitor. The electrodes on the layers are alternately stacked to contact the outer edge of opposite sides of the stack to form a group of parallel capacitors. This construction, while permitting the use of thin films to increase the capacitance, is preferred over a single film of increased area due to the fragility of the thin ceramic film.

It would, however, be desirable to provide a selflimiting capacitive device having in situ high voltage surge protection while providing a useful level of capacitance.

SUMMARY OF THE INVENTION

It is therefore an object of this invention to provide a self-limiting ceramic capacitor.

It is another object of this invention to provide a self-limiting ceramic capacitor formed using a zinc oxide-based metal oxide material exhibiting non-linear resistive properties.

It is yet another object of this invention to provide a self-limiting ceramic capacitor formed using a zinc oxide-based metal oxide material exhibiting non-linear resistive properties formed by laminating together thin films of such material having a conductive coating on one surface of the film.

It is a further object of this invention to provide a self-limiting capacitor formed using a zinc oxide-based metal oxide material exhibiting non-linear resistive properties formed by laminating together thin films of such material coated with conductive material thereon and interconnected together to form a capacitor having desired values of capacitance and resistance.

These and other objects of the invention will be apparent from the following description and accompanying drawings.

In accordance with the invention, a self-limiting ceramic capacitor comprises a stack of thin film ceramic layers comprising a ceramic mixture of at least about 90 mole % ZnO with the balance comprising other metal oxides and exhibiting non-linear resistance with each film layer having an electrode coating on at least one surface thereof and interconnected together to form a capacitor having the desired capacitance and protective characteristics.

BRIEF DESCRIPTION OF THE DRAWINGS

FIG. 7b is a top view of an adjacent layer to the layer of FIG. 7a.

DESCRIPTION OF THE PREFERRED EMBODIMENTS

The invention comprises a self-limiting ceramic capacitor which will exhibit the characteristics of both a ceramic capacitor and a varistor in a single device. This is accomplished using a zinc oxide-based ceramic material exhibiting non-linear resistance characteristics formed into a plurality of thin film layers each having a conductive coating or electrode formed on one surface thereof and stacked together and electrically interconnected to form the desired capacitance and resistance.

Figure 1:
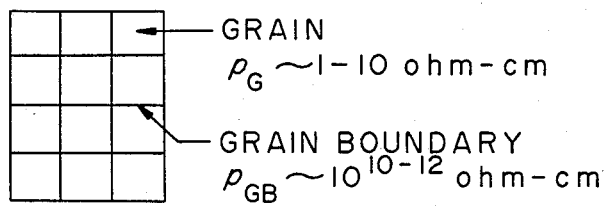
FIG. 1 is an illustration of grain versus grain boundary resistivity.
Figure 2:
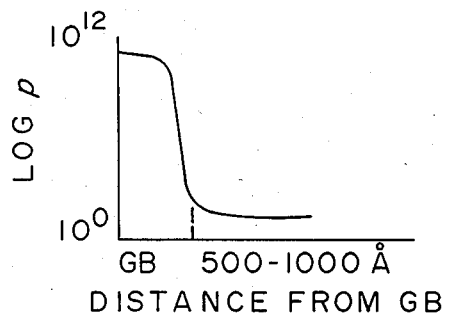
FIG. 2 is a plot of the resistivity profile of the depletion layer at the grain boundary.

In order to understand the capacitive component of the device, it is necessary to describe the basic building block of the ZnO-based layers. The basic building blocks are comprised of ceramic microstructures shown schematically in FIG. 1 and can be described as an array of ZnO grains separated by grain boundaries. The varistor action of the material arises as a result of different electrical characteristics of the grain boundaries between the ZnO grains in relation to the ZnO grains themselves. The grain boundaries are highly resistive, i.e., about $10^{12}$ ohm-centimeters, while the grains are highly conductive, i.e., about 1-10 ohm-centimeters, resulting in a sharp drop in resistivity from the grain boundary to the grain, as shown in FIG. 2, within a distance of about 500-1000 Angstroms, known as the depletion layer.

The presence of this depletion layer causes a voltage drop across the grain boundary, typically of the order of about 2-4 volts/grain boundary. The most important feature of the depletion layer is that the voltage drop is composed of two components, a resistive (R) component and a capacitive (C) component, as shown in the equivalent circuit of FIG. 3.

Figure 3:
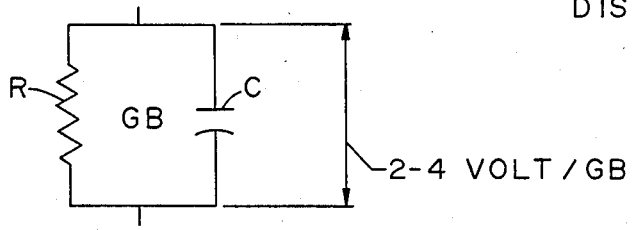
FIG. 3. is an electrical schematic of an equivalent circuit at the grain boundary.

By grain boundary equivalent circuitry is meant a semiconductor material whose grain boundaries have resistive and capacitive characteristics equivalent to the circuit shown in FIG. 3. Semiconductor materials useful in the practice of this invention are materials whose grain boundaries exhibit electrical characteristics equivalent to the circuitry shown in FIG. 3. Examples of such material are base materials of ZnO, TiO or CdO. That is, the ceramic semiconductor mixture contains at least about 60 mole %, and preferably at least 90 mole %, of these base materials.

In forming a useful capacitor from such materials, advantage is taken of the capacitance in the region of the grain boundary, when the device is operated below the breakdown voltage level. A high value of capacitance is obtained in accordance with the invention by arranging the capacitance in parallel, through formation of the ceramic material into thin ceramic tape segments and then multilayering these segments in a parallel configuration as described previously.

Figure 4:
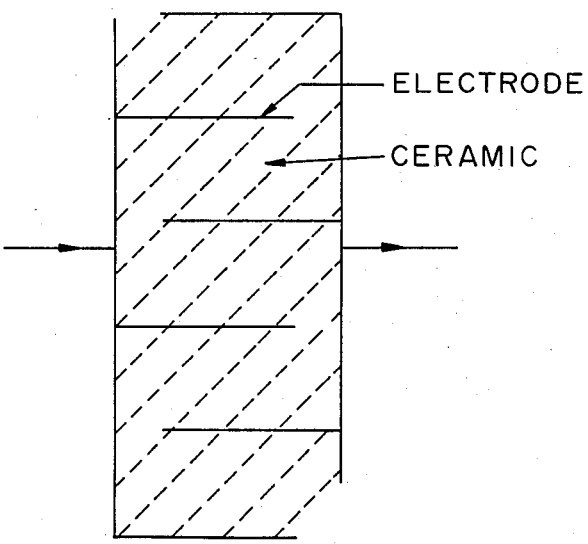
FIG. 4 is a vertical cross-section of a capacitor constructed in accordance with the invention.
Figure 5:
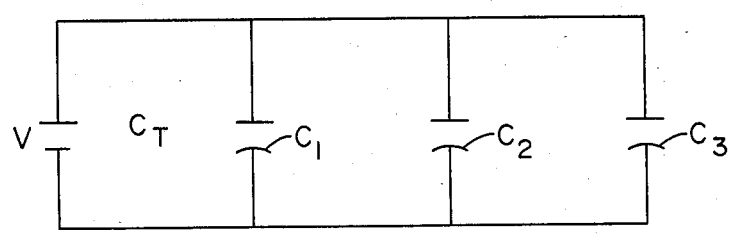
FIG. 5 is a schematic of the equivalent capacitor circuit to the structure of FIG. 4.

This arrangement of the thin ceramic layers and metal electrodes thereon is shown schematically in FIG. 4. With this arrangement, the total capacitance ($C_T$) will be given by the summation of the individual capacitance of the layers, i.e., $C_1 + C_2 + C_3 + \ldots$ as shown in FIG. 5. Thus, a large magnitude of capacitance can be built into the design by simply connecting the capacitors (layers) in parallel with the applied voltage maintained below the turn-on voltage of the ceramic material as will be discussed below.

Figure 6:
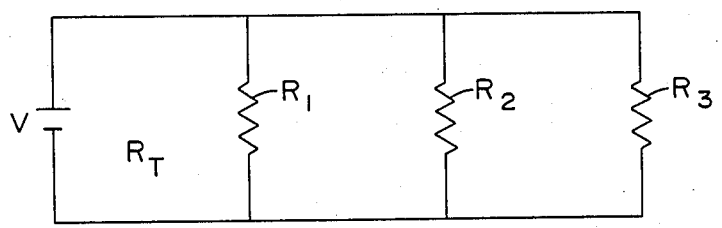
FIG. 6 is a schematic of the equivalent resistor circuit to the structure of FIG. 4.

With parallel configuration of the capacitor-layers the resistive component will also be connected in parallel as shown in FIG. 6. The effect of this will be exactly opposite to that of capacitance connected in parallel, i.e., the total effective resistance ($R_T$) will be reduced according to $$R_T = \frac{1}{1/R_1 + 1/R_2 + 1/R_3 + \ldots}$$

Thus, the advantage of the proposed design is to achieve a high value of capacitance combined with a low value of resistance. The greater the number of layers, the higher the capacitance and the lower the resistance. The most desirable capacitor will be comprised of a plurality of layers wherein each ceramic layer is extremely thin, i.e., from about 10 to about 250 microns, preferably 15 to 30 microns. Equally important is to select an operating voltage which is below the turn on voltage of the material in the thin layers. When the device sees a transient voltage in excess of the safe operating voltage of the capacitor, i.e., the turn on voltage of the material, it will then act as a varistor and, thus, limit the voltage. Upon removal of the transient, the device will again act as a capacitor. Thus, it is a self-limiting capacitor.

The term "high capacitance" as used herein is intended to define a capacitance of at least about hundreds of picofarads, e.g., 200 picofarads.

The term "thin film" as used herein is intended to define a ceramic film having a thickness of from about 10 to 250 microns.

The term "turn on voltage" as used herein is intended to refer to the threshold voltage at which the resistance of the ceramic material drops sufficiently to permit the ceramic material to temporarily act as a low resistance conductor. This voltage level is determined or controlled by the thickness of the layer as well as the grain size of the polycrystalline ceramic.

By ZnO type grain boundary properties is meant a ceramic semiconductor material having a grain boundary equivalent circuit to ZnO comprising a capacitor and resistor which may be connected in parallel or in series or combinations thereof. Other ceramic semiconductor materials can include TiO and CdO.

Figure 7A:
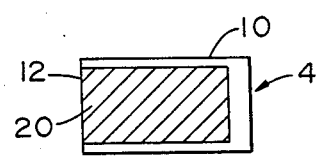
FIG. 7a is a top view of one layer of the capacitor of FIG. 4.
Figure 7B:
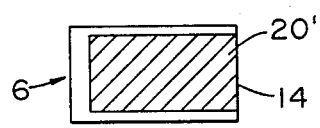

Referring to FIGS. 7a and 7b, a thin film of zinc oxide-based ceramic mixture is formed on a substrate to form a green tape of approximately 10 to 250 microns thick, preferably 12 to 45 microns. The green tape or film is then cut to desired size tape segments 10.

A conductive coating 20 is applied over first tape segment 10 to form a first electrode layer. As seen in FIG. 7a, conductive coating 20 is formed contiguous with a first edge 12 of tape segment 10. Conductive coating 20' is formed on another tape segment 10' in FIG. 7b contiguous with the opposite edge 14 of tape segment 10' to form a second electrode layer.

The zinc oxide-based ceramic mixture useful in forming the capacitor of the invention comprises a mixture of from at least about 90 mole % up to about 96 mole % zinc oxide, with the balance made up of one or more other metal (or metalloid) oxides, such as bismuth oxide, cobalt oxide, manganese oxide, antimony oxide, aluminum oxide, silicon oxide, alkali metal oxides, boron oxide and mixtures of such metal oxides.

The particle size range of the metal oxides used in the ceramic mixture varies from about 0.1 to 1.0 microns. It should be noted that ceramic particles on firing will form grains of larger size, for example, on the order 2 to 25 micrometers. The composition of the ceramic material and the grain size, as well as the thickness of the ceramic layers, for the most part, will determine the capacitance and resistance as related to grain boundary properties.

The metal oxide mixture is mixed with appropriate binders, such as, for example, polyvinylbutyral and plasticizer such as polyethylene glycol dissolved in solvents, such as xylene, toluene, ethanol, etc.

The mixture is conventionally ball milled for 5 to 20 hours and then slip cast on an organic carrier, such as, for example, a cellulose acetate carrier which will allow stripping of the tape upon drying. The slip may be air dried at room temperature from about 12 to 48 hours and the resulting thin green ceramic tape is then cut into pieces for processing.

An electrode is then formed on one surface of the cut tape, for example, by screen printing a conventional electrode ink, such as a silver-palladium or platinum ink capable of withstanding subsequent sintering temperatures. When sintering is conducted at less than 1000° C., silver paint can be used. However, for co-firing of a stack of electrode-coated green ceramic layers to form the laminated device of the invention, the use of high temperature noble metal electrode coatings is preferred.

After screen printing the electrode, the green tapes are laminated by stacking the tape segments so that the electrodes, respectively illustrated in FIGS. 7a and 7b, terminate alternatively at opposite edges as shown in the stack illustrated in FIG. 4 and then are sintered in air- or oxygencontaining atmosphere at a temperature of from about 1000° to 1200° C. for a time of from 2 to 24 hours.

Following this, conductive surfaces are formed on two opposite edges of the sintered ceramic stack to join together all the electrodes extending to the respective edges. Silver paint, subsequently applied and then fired at less than 1000° C., may be used to form the conductive edges on the already fired stack.

Leads may then be optionally attached to the respective conductive surfaces on the opposite edges of the laminated stack and the stack may then be encapsulated in plastic, if desired.

The amount of capacitance, as well as the resistance, will depend not only on the grain size and layer thickness, but also upon the number of layers used in the stack as previously discussed.

Thus, to increase the capacitance, one may add further layers or change the total area of each layer. That is, as noted, changing the thickness of the layer as well as the grain size will also change the capacitance.

Figure 8:
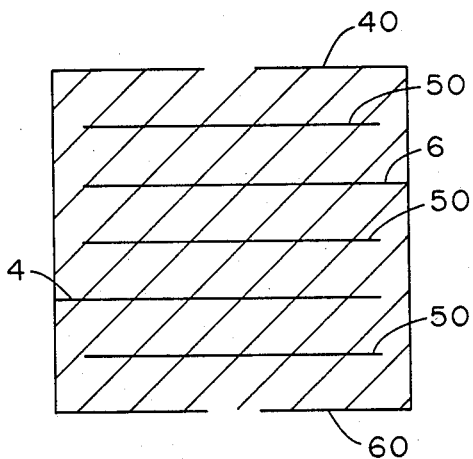
FIG. 8 is a side section view of a capacitor stack constructed in accordance with the invention.
Figure 9:
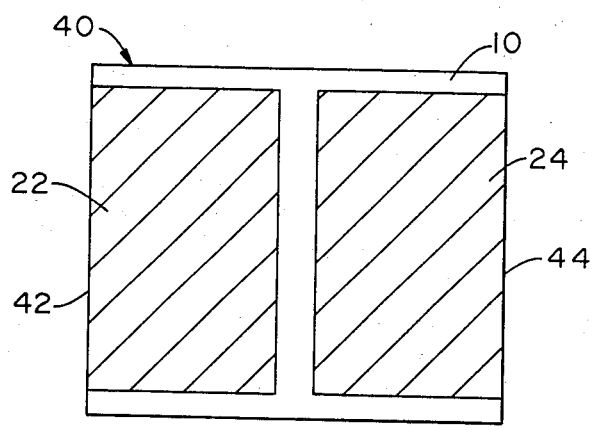
FIG. 9 is a top view of the top and bottom layers of the structure shown in FIG. 8.
Figure 10:
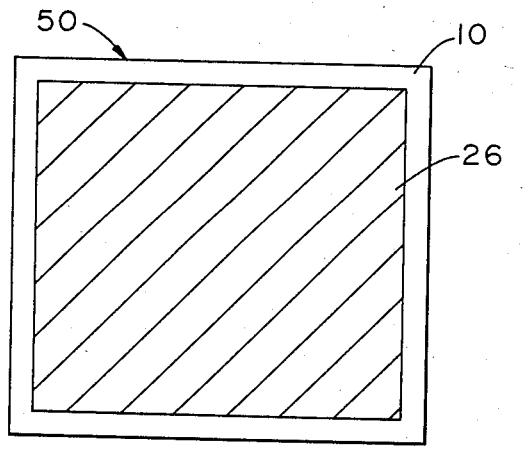
FIG. 10 is a top view of one of several of the intermediate layers of the structure shown in FIG. 8.

In addition to the use of additional layers of electrode-coated ceramic tape, different configurations may be used for the electrode patterns to vary the total amount of capacitance and resistance for a given number of layers. This is shown in FIGS. 8-10 wherein top layer 40 and bottom layer 60 are identically formed and each of these layers is provided with a split electrode having a first conductive portion or coating 22 terminating at edge 42 and a second electrode portion or coating 24 terminating at opposite edge 44. In between top layer 40 and bottom layer 40 are two conventional electrode layers 4 and 6 formed as previously described with all of the foregoing layers separated respectively by electrode-coated ceramic layers 50 which, as shown in FIG. 10, have buried electrode coatings 26, i.e., electrode coatings which do not extend to the edge of the layer and, therefore, form only series capacitance and resistance with adjoining layers.

It should be further noted that a capacitor/resistor could be built using only a stack of electrode-coated ceramic layers 50 with buried electrode coating 26 thereon to provide a device with maximum resistance and minimum capacitance.

As an illustration of the invention, the capacitance and resistance data at 100 KHZ and self-limiting voltage, i.e., the voltage at which the device will clear or divert any excessive transient voltage, are shown in Table I.

TABLE I

Pertinent Data for Self-Limiting Capacitance

| Sample No. | Layer | Configuration | Capacitance (C) | Resistance (R) | Self-limiting Voltage at IMA |
|---|---|---|---|---|---|
| 594636 | 7 | parallel | 12.9 nF | 2.41 Ω | 36 V |
| 594640 | 7 | series | 0.349 nF | 96 Ω | 434 V |
| 594648 | 1 | single | 0.794 nF | 49 Ω | 89 V |

Figure 11:
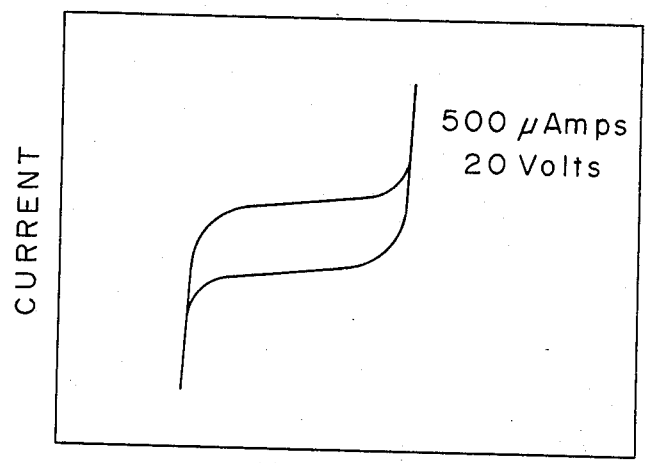
FIG. 11 shows the current voltage characteristic of a multi-layered co-fired paralelly connected self-limiting capacitor.

The table contains data from three devices. The first device was made with 7 layers in parallel with platinum electrodes between the ceramic layers, the layer thickness being approximately 100 microns. The second device had 7 layers in series, and the third device was made with a single layer of ceramic material. The area in each layer was approximately 0.75" by 0.75" square area. The device with the parallel configuration has the highest capacitance (12.9 nF) and the lowest resistance (2.41Ω). Also, the device with series configuration has lowest capacitance (0.349 nF) and highest resistance (96Ω). The single layer device has the intermediate values (C=0.794 nF and R=49Ω). The DC resistance of these devices are in the range of mega ohms. It will be seen from these data that the multilayer parallel device has very high capacitance and beneficial protective characteristics, as shown in FIG. 11. That is, the characteristic of the self-limiting capacitor, e.g., protective properties, the current-voltage characteristic (at 60 Hz) of a multilayer co-fired parallelly connected self-limiting capacitor are shown in FIG. 11. It has the characteristic of a varistor upon exceeding a critical voltage. The broadening of the middle section of the I-V curve is due to a high value of capacitance and not a hysteresis effect.

Conventional $BaTiO_3$ based capacitors are limited by the curie temperature (i.e., if the ambient temperature exceeds the curie temperature, the device is no longer a capacitor). The subject capacitor has no such limiting curie temperature. Further, it will be noted that the capacitance of the present capacitor is virtually unlimited in magnitude because additional capacitance may be added as desired. That is, capacitance may be expanded by both increasing the grain boundary capacitance and also by increasing the number of layers. Another advantage of the present capacitor-varistor includes the fact that voltage can be adjusted as required through composition, grain size and by connection in series. The present capacitor is not limited by a dielectric constant such as, for example, is the case with $BaTiO_3$ type capacitors.

The device voltage can be increased by connecting the conducting layers in series in addition to parallel connection. In this way, the voltage may be increased while maintaining a high capacitance. For example, in FIG. 8, it will be noted that with buried electrode 50, part of the electrical connection is in series. For example, current going in one side must make two series breakdowns before finding an electrode in parallel to the opposite side.

Thus, the invention provides for a self-limiting capacitance device formed using a plurality of layers of thin film dielectric material having non-linear resistance characteristics and formed in a manner which provides high capacitance and a desired resistance or protective properties.

Having thus described the invention, what is claimed is:

1. A self-limiting ceramic capacitor having high capacitance and transient voltage protective properties, the capacitor comprising a plurality of thin film layers of semiconducting ceramic characterized by grain boundary equivalent circuitry, the ceramic having non-linear resistance characteristics and sintered together to form a laminated stack; the thin layers having a conductive coating on at least one surface thereof, some of the conductive coatings extending to a first edge of said stack and the remainder having the conductive coating extending to a second edge; conductive material on said first edge of said laminated stack of thin film ceramic layers and in electrical communication with a portion of the conductive coating extending to said first edge to provide a first connected electrode; and conductive material on said second edge of said plurality of layers and in electrical communication with a portion of the conductive coating extending to said second edge to provide a second connected electrode, said electrode and thin layers of ceramic in combination providing said self-limiting capacitor.

2. The self-limiting ceramic capacitor in accordance with claim 1 wherein the ceramic is a zinc oxide type material.

3. The self-limiting capacitor of claim 1 wherein each of said ceramic layers having a conductive coating extending to said first edge of said plurality of layers is interleaved with ceramic layers having a conductive coating extending to said second edge whereby said capacitor comprises a plurality of capacitors connected in parallel.

4. The self-limiting capacitor of claim 3 wherein the layers are connected in series in addition to being connected in parallel to increase voltage while maintaining high capacitance.

5. The self-limiting capacitor of claim 3 wherein said second edge of said plurality of layers is opposite said first edge.

6. The self-limiting capacitor of claim 5 wherein said capacitor is formed by coating each of said thin film ceramic layers with a conductive coating before said ceramic is fired and then firing said coated thin film ceramic layers in a stack to laminate said ceramic layers and said conductive coatings thereon.

7. The self-limiting capacitor of claim 6 wherein said ceramic material comprises ZnO.

8. The self-limiting capacitor of claim 6 wherein said ceramic material comprises at least about 60 mole % of ZnO.

9. The self-limiting capacitor of claim 8 wherein said ZnO comprises from about 90 to 96 mole % of said ceramic material.

10. The self-limiting capacitor of claim 9 wherein the balance of said ceramic material comprises one or more metal oxides selected from the class consisting of alkali metal oxides, boron oxide, bismuth oxide, cobalt oxide, aluminum oxide, silicon oxide, and mixtures thereof.

11. The self-limiting capacitor of claim 10 wherein said ceramic material has an average grain size of from about 1 to 50 microns.

12. The self-limiting capacitor of claim 11 wherein said ceramic material is formed into a green tape having a thickness of from about 10 to 250 microns.

13. The self-limiting capacitor of claim 12 wherein said green tape is coated with a conductive material capable of withstanding sintering temperatures above 1000° C.

14. The self-limiting capacitor of claim 11 wherein said ceramic material is formed into a green tape having a thickness of from about 12 to 35 microns.

15. A method of forming a self-limiting ceramic capacitor comprising:
   (a) forming a mixture of ceramic material having grain boundary equivalent circuitry and exhibiting non-linear resistance characteristics;
   (b) producing a green ceramic tape from said ceramic mixture having a thickness of from about 10 to 250 microns;
   (c) applying a conductive coating on a surface of said green ceramic tape;
   (d) forming a stack from said coated ceramic tape, the stack having non-contiguous first and second sides, the tape arranged in said stack so as to provide interleafing conductive coatings extending from said first and second sides;
   (e) sintering said stack of coated green ceramic tape to laminate them together; and
   (f) coating said first and second sides of said laminated stack with conductive material to interconnect said conductive coatings with one or the other of said conductive material on said two sides.

16. The method of claim 15 wherein said step of forming said mixture of ceramic material exhibiting non-linear resistance characteristics further including forming a mixture comprising from 90 to 96 mole % ZnO having a particle size range of from about 0.1 to 1.0 microns.

17. The method of claim 16 wherein the balance of said non-linear ceramic material comprises one or more metal oxides selected from the class consisting of alkali metal oxides, boron oxide, bismuth oxide, cobalt oxide, aluminum oxide, silicon oxide, and mixtures thereof.

18. The method of claim 16 wherein said step of producing said green tape further comprises forming a slip having a thickness ranging from about 10 to 250 microns and cutting said tape into segments.

19. The method of claim 18 wherein said step of applying a conductive coating on said segments of green ceramic tape further comprises applying a conductive material capable of withstanding subsequent exposure to a sintering temperature of at least 1000° C.

20. The method of claim 19 wherein said conductive coating comprises one or more of the platinum metals.

21. The method of claim 20 wherein said stack of thin film ceramic layers having said conductive coating material thereon is sintered at a temperature of from about 1000° to 1200° C. for a period of from about 2 to 24 hours.

22. The method of claim 19 wherein said step of applying a conductive coating on a surface of said green ceramic tape segment includes extending said conductive coating on at least some of said segments to a single edge of said segment while terminating said coating at a point spaced from the remaining edges of said segment.

23. The method of claim 22 wherein said green tape segments having said conductive coating extending to a single edge of said segment are stacked in alternate fashion so that every other segment having said conductive coating applied to said single edge has a conductive coating extending to an opposite edge and said step of coating two edges of said laminated stack with conductive material comprises coating two opposite edges to interconnect respectively with said conductive coatings applied to a single edge of said segments.

24. The method of claim 23 wherein said step of applying said conductive coating on said surface of said green tape segments further comprises forming two discontinuous portions of a conductive coating on the surface of one or more segments with each of said discontinuous portions extending to an opposite edge of said tape segment to connect with said respective conductive coatings on the respective edges of said laminated stack.

25. The method of claim 24 wherein said step of applying said conductive coating to said green ceramic tape further comprises applying said coating to one or more segments while terminating said conductive coating at a point sufficiently spaced from all of the edges of said segment to prevent electrical contact with said conductive material applied to any of the edges of said laminated stack and said step of forming said stack further includes positioning said segment having a conductive coating thereon spaced from all of said edges adjacent a segment coated with said discontinuous conductive coating portions whereby said coated segments cooperate to form two capacitors in series with said conductive coating spaced from said edges acting as a common floating electrode of said two capacitors and said discontinuous conductive portions respectively acting as the other electrode of each of said two capacitors in series.

26. A method of forming a self-limiting ceramic capacitor comprising:
(a) forming a mixture of ceramic material exhibiting non-linear resistance characteristics and having a particle size range of from about 0.1 to 1.0 microns;
(b) producing a thin film green ceramic tape from said ceramic mixture having a thickness of from about 25 to 160 microns;
(c) cutting rectangular segments from said green ceramic tape;
(d) applying a conductive coating on a surface of a plurality of said rectangular segments of green ceramic tape;
(e) forming a stack of said rectangular green ceramic tape segments;
(f) sintering said stack of coated green ceramic tape segments to laminate them together; and
(g) coating two edges of said laminated stack with conductive material to interconnect said conductive coatings on said segments respectively with one or the other of said conductive material on said two edges.

27. A self-limiting ceramic capacitor device having high capacitance and in situ transient voltage protection properties wherein said capacitor, when exposed to a voltage in excess of the safe operating voltage of said capacitor will act as a varistor and thus limit the voltage until said excess voltage is removed when said device will again act as a capacitor, said capacitor comprising a plurality of thin film layers of semiconducting ceramic characterized by grain boundary equivalent circuitry and non-linear resistance characteristics which permit it to function as a varistor upon exposure to a voltage in excess of the safe operating voltage of the capacitor; said thin film layers sintered together to form a laminated stack; said thin layers having a conductive coating on at least one surface thereof, some of said conductive coatings extending to a first edge of said stack and at least some of the remainder of said thin layers having said conductive coating extending to a second non-contiguous edge; conductive material on said first edge of said laminated stack of thin film ceramic layers and in electrical communication with said conductive coating extending to said first edge to provide a first connected electrode; and conductive material on said second edge of said laminated stack and in electrical communication with said conductive coating extending to said second edge to provide a second connected electrode, said electrodes and thin layers of ceramic in combination providing said self-limiting capacitor.

28. A method of forming a self-limiting ceramic capacitor device having high capacitance and in situ transient voltage protection properties comprising:
(a) forming a mixture of ceramic material having grain boundary equivalent circuitry and exhibiting non-linear resistance characteristics whereby a capacitor, formed from said ceramic material and exposed to a voltage in excess of the safe operating voltage of said capacitor, will act as a varistor and thus limit the voltage until said excess voltage is removed whereupon said device will again act as a capacitor;
(b) producing a green ceramic tape from said ceramic mixture having a thickness of from about 10 to 250 microns;
(c) applying a conductive coating on a surface of said green ceramic tape;
(d) forming a stack of tape segments from said coated green ceramic tape, said stack having non-contiguous first and second sides, said tape segments arranged in said stack so as to provide interleaving conductive coatings extending from said first and second sides;
(e) sintering said stack of coated green ceramic tape segments to laminate them together; and
(f) coating said first and second sides of said laminated stack with conductive material to interconnect said conductive coatings on said segments with one or the other of said conductive material on said two sides;

whereby a self-limiting capacitor device is formed characterized by high capacitance and in situ transient voltage protection.

* * * * *